(12) United States Patent
Ekberg

(10) Patent No.: US 11,868,466 B2
(45) Date of Patent: Jan. 9, 2024

(54) APPARATUS AND METHOD FOR ENFORCING HARDWARE-ASSISTED MEMORY SAFETY

(71) Applicants: Huawei Technologies Co., Ltd., Shenzhen (CN); Jan-Erik Ekberg, Helsinki (FI)

(72) Inventor: Jan-Erik Ekberg, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 224 days.

(21) Appl. No.: 17/434,643

(22) PCT Filed: Mar. 12, 2019

(86) PCT No.: PCT/EP2019/056138
§ 371 (c)(1),
(2) Date: Aug. 27, 2021

(87) PCT Pub. No.: WO2020/182296
PCT Pub. Date: Sep. 17, 2020

(65) Prior Publication Data
US 2022/0179947 A1  Jun. 9, 2022

(51) Int. Cl.
*G06F 21/54* (2013.01)
*G06F 21/55* (2013.01)
(Continued)

(52) U.S. Cl.
CPC ........... *G06F 21/54* (2013.01); *G06F 9/3004* (2013.01); *G06F 9/30058* (2013.01); *G06F 21/556* (2013.01); *G06F 21/79* (2013.01)

(58) Field of Classification Search
CPC ........ G06F 21/54; G06F 21/57; G06F 21/556; G06F 9/3004; G06F 9/30058
See application file for complete search history.

(56) References Cited

U.S. PATENT DOCUMENTS 8,645,704 B2 * 2/2014 Savagaonkar ........ G06F 21/629
713/182
9,785,440 B2  10/2017 Dehon
(Continued)

OTHER PUBLICATIONS

"Coordinated Bank and Cache Coloring for Temporal Protection of Memory Accesses"—Suzuki et al 2013 IEEE 16th International Conference on Computational Science and Engineering https://ieeexplore.ieee.org/stamp/stamp.jsp?arnumber=6755286 (Year: 2013).*

(Continued)

*Primary Examiner* — Randy A Scott
(74) *Attorney, Agent, or Firm* — Conley Rose, P.C.

(57) ABSTRACT

An apparatus includes a processor coupled to a memory. The processor calls a second function from a first function by coloring with an inaccessible color value a first memory area associated with the first function, branching to the second function, coloring with a second color value a second memory area associated with the second function, operating on the second memory area, and coloring with the inaccessible color value the second memory area. The processor then returns control to the first function, and colors with a first color value the first memory area. The coloring step includes branching to a coloring routine that includes a basic block beginning with a single branch target instruction, identifying and authorizing the calling routine, coloring with a hardcoded color value a memory area associated with the calling routine, and returning to the calling routine.

20 Claims, 4 Drawing Sheets

(51) Int. Cl.
*G06F 21/79* (2013.01)
*G06F 9/30* (2018.01)

(56) References Cited

U.S. PATENT DOCUMENTS

| | | | |
|---|---|---|---|
| 10,084,784 B1* | 9/2018 | Brandwine | H04L 63/102 |
| 2008/0250216 A1 | 10/2008 | Kershaw et al. | |
| 2014/0096245 A1 | 4/2014 | Fischer | |
| 2017/0083255 A1 | 3/2017 | Chiricescu et al. | |

OTHER PUBLICATIONS

"Coordinated Bank and Cache Coloring for Temporal Protection of Memory Accesses"—Suzuki et al., 2013 IEEE 16th International Conference on Computational Science and Engineering, Dec. 2013 https://ieeexplore.ieee.org/stamp/stamp.jsp?arnumber=6755286 (Year: 2013).*

"Watchdog: Hardware for Safe and Secure Manual Memory Management and Full Memory Safety"—Nagarakatte et al., Computer and Information Science, University of Pennsylvania, ISCA 2012, Jun. 2012 https://people.cs.rutgers.edu/~sn349/papers/isca12_watchdog.pdf (Year: 2012).*

Asia Slowinska, et al., "Body armor for binaries: preventing buffer overflows without recompilation," Proceedings of USENIX Annual Technical Conference, Jun. 2012, 13 pages.

Chengyu Song, et al, "HDFI: Hardware-Assisted Data-flow Isolation," IEEE Symposium on Security and Privacy, 2016, 17 pages.

Matthew S. Simpson, et al, "MemSafe: ensuring the spatial and temporal memory safety of C at runtime," Software-Practice and Experience, Softw. Pract. Exper. 2013; 43:93-128, Feb. 2, 2012, 36 pages.

Xiao Zhang, et al, "Towards Practical Page Coloring-based Multicore Cache Management," EuroSys 09, Apr. 1-3, 2009, Nuremberg, Germany, 14 pages.

Santosh Nagarakatte, et al, "Watchdog: Hardware for Safe and Secure Manual Memory Management and Full Memory Safety," 2012 IEEE, 12 pages.

* cited by examiner

APPARATUS AND METHOD FOR ENFORCING HARDWARE-ASSISTED MEMORY SAFETY

CROSS-REFERENCE TO RELATED APPLICATIONS

This application is a U.S. National Stage of International Patent Application No. PCT/EP2019/056138 filed on Mar. 12, 2019, which is hereby incorporated by reference in its entirety.

TECHNICAL FIELD

The aspects of the disclosed embodiments relate generally to mobile computing apparatus and more particularly to software security within mobile computing apparatus.

BACKGROUND

Over the past decade, memory safety within computer processors has been the focus of much effort on both the attack as well as prevention sides of the problem. Viruses and root kits have been developed to employ code overwriting and execution of data areas, such as by exploiting buffer overrun defects, to compromise computing devices. Prevention features such as write xor execute (W/\X), or more generally data execution prevention (DEP), has mitigated most deleterious effects of these attacks. In response newer "return to libc", or more generally "return oriented programming" (ROP) and "data oriented programming" (DOP) attacks are being developed to work around DEP protections.

Current approaches for increasing memory safety focus on enforcing call-flow integrity. This may be achieved through hardware means, such as by using pointer authentication available in some ARM architectures, by employing hardware supported shadow stacks to track call invocations as being explored by INTEL Corp., as well as pure software solutions. However, these protection means typically do not guarantee memory safety beyond the call flow itself. Furthermore, many solutions incur a very high performance overhead, sometimes as much as 400 percent, making them undesirable or impractical for many applications.

Some research efforts are focusing on building hardware platforms aimed at memory safety. One such effort is the CHERI (capability hardware enhanced RISC instructions) project at Cambridge University. CHERI introduces what is referred to as fat pointers into a MIPS architecture to combine pointer integrity with memory segmentation. These features can be used to achieve architectures for memory safety. However, these approaches are still early in the research phase and are not generally available.

Accordingly, it would be desirable to provide methods and apparatus that address at least some of the problems identified above.

SUMMARY

It is an object of the disclosed embodiments to provide improved methods and apparatus that can provide near full memory safety and call flow integrity within computing apparatus with little computational or memory overhead. This object is solved by the subject matter of the independent claims. Further advantageous modifications can be found in the dependent claims.

According to a first aspect, the above and further objects and advantages are obtained by an apparatus including a processor coupled to a memory wherein the processor and the memory are configured to provide branch target instruction protection and memory coloring protection. The processor is adapted to call a second function from a first function by coloring, with an inaccessible color value, a first memory area associated with the first function and branching to the second function. While executing within the second function the processor is configured to color with a second color value, a second memory area associated with the second function, operate on the second memory area, and color, with the inaccessible color value, the second memory area. The processor then returns control to the first function, and colors, with a first color value, the first memory area. The first color value, the second color value, and the inaccessible color value each represent different distinct color values, and the coloring comprises branching to a coloring routine that includes a basic block beginning with a single branch target instruction. The coloring identifies and authorizes the calling routine, colors, with a hard-coded memory color value, a memory area associated with the calling routine, and returns to the calling routine. The combination of coloring and BTI provide near full memory safety and ensure call flow integrity within the apparatus.

In a first possible implementation form of the apparatus according to the first aspect the coloring routine is located in an execute-only memory area, and the processor is configured to prevent writing to the execute-only memory area. Protecting the coloring routine from modification prevents a malicious application from taking control of the coloring and thereby accessing confidential or sensitive information.

In a possible implementation form of the apparatus according to the first aspect as such the first memory area and second memory area are allocated in a read/write portion of the memory and comprise at least one of a stack frame and a heap area. The processor is configured to prevent execution of data in the first memory area or the second memory area. Memory safety is advantageously applied to all types of memory spaces and is not limited to protection of the stack.

In a possible implementation form of the apparatus one or more stack parameters are passed from the first function to the second function, and the one or more stack parameters are colored with a third color value. The third color value is different than either of the inaccessible color value or the first color value, and the processor is configured to read and/or write the one or more stack parameters. Using a different color for the stack parameters than is used by the first or second function isolates the parameters from other portions of the code.

In a possible implementation form of the apparatus one or more memory objects are stored in the second stack frame, and each of the one or more memory objects is colored with a distinct color value. The processor is configured to read and/or write the one or more memory objects. The use of smaller granules, such as individual memory objects, improves security because compromising one colored memory area provides access to a smaller amount of data.

In a possible implementation form of the apparatus the second function comprises a plurality of basic blocks, and memory objects associated with each basic block are colored with a distinct color value. The use of smaller granules, such as individual basic blocks, improves security because compromising one colored memory area provides access to a smaller amount of data.

In a possible implementation form program instructions associated with an application are colored with a fourth color value and all routines associated with a software library that is accessed by the application are colored with a fifth color value. The fourth color value is different than the fifth color value, and the processor is configured to execute the application. Coloring the software library differently than the remaining application code protects the application from the library without undue development overhead.

In a possible implementation form the second memory area comprises a stack frame, and coloring the second memory area with the inaccessible color value, comprises the processor resetting the second memory area to zero values. Resetting the memory area to zero permanently erases any sensitive data that may have been stored therein.

In a possible implementation form the apparatus comprises a mobile communications device. Full memory safety and call flow integrity are particularly important for mobile communication devices given the increasing use of banking, payment, and personal information applications stored thereon.

According to a second aspect, the above and further objects and advantages are obtained by a computer implemented method, wherein the computer is configured to provide branch target instruction protection and memory coloring protection. The method includes coloring, with an inaccessible color value, a first memory area associated with the first function; branching to the second function; coloring, with a second color value, a second memory area associated with the second function; and operating on the second memory area based on the second function. The method then colors, with the inaccessible color value, the second memory area; returns to the first function; and coloring with a first color value, the first memory area. The first color value, the second color value, and the inaccessible color value each comprise distinct color values. The coloring includes branching to a coloring routine, where the coloring routine includes a single basic block beginning with a branch target instruction. The coloring identifies and authorizes a calling routine; colors, with a hardcoded color value, a memory area associated with the calling routine; and returns to the calling routine. The combination of coloring and BTI provide near full memory safety and ensure call flow integrity within the apparatus.

In a first possible implementation form of the method the coloring routine is located in an execute-only memory area. Storing the coloring routine in an execute only memory area prevents an attacker from taking control of the coloring by modifying the coloring routine.

In a possible implementation form of the method the one or more stack parameters are passed from the first function to the second function, and the one or more stack parameters are colored with a forth color value. The third color value is different than any of the inaccessible color value, the first color value, and the second color value. Coloring the parameters differently than either of the first or second function allows access to the parameters to be controlled independently from the memory associated with either of the functions.

In a possible implementation form of the method the one or more memory objects are stored in the second stack frame and each of the one or more memory objects is colored with a distinct color value. Reducing the size of colored memory areas reduces risk by limiting the amount of data accessible to an attacker that compromised a particular memory area.

In a possible implementation form of the method the second function comprises a plurality of basic blocks, and memory objects associated with each basic block are colored with a distinct color value. Using a different memory color for each basic block limits the data available to an attacker that compromises a basic block.

According to a third aspect, the above and further objects and advantages are obtained by a computer program product including non-transitory computer program instructions that when executed by a processor are configured to cause the processor to perform the method according to the second aspect.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
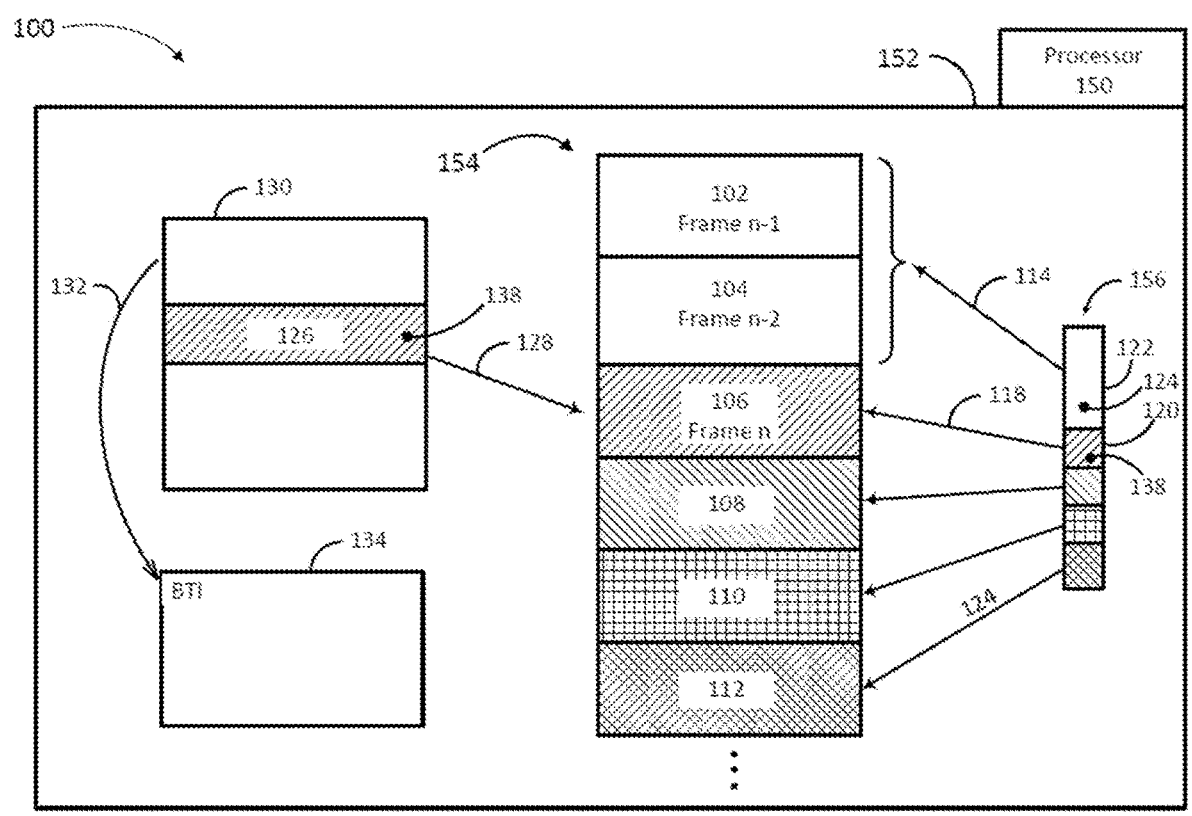
FIG. 1 shows a block diagram illustrating a computing apparatus configured to provide near full memory safety incorporating aspects of the disclosed embodiments.

Referring now to FIG. 1 there can be seen a block diagram illustrating an apparatus 100 configured to provide near full memory safety incorporating aspects of the disclosed embodiments. The apparatus 100 is appropriate for use in many common types of computing apparatus such as mobile communication devices, smart phones, tablet computers, phablets, laptop computer, or other computing apparatus that would benefit from improved memory safety and security. The apparatus 100 includes a processor 150 communicatively coupled to a computer memory 152. The memory 152 may be any appropriate type of computer readable and writeable memory such as RAM, DRAM, or other types of physical memory which may be managed by the processor 150 or by other supporting memory management hardware and software working in conjunction with the processor 150 to beneficially manage the computer memory 152.

As will be described further below, near full memory safety and call flow integrity can be achieved through a novel use of hardware features supported by the apparatus 100. These features, which are designed to aid security and protect the apparatus 100 from malicious software attacks, include computing hardware support for write xor execute (W/\X) protection, memory coloring, and branch target indication (BTI) mechanisms.

Figure 2:
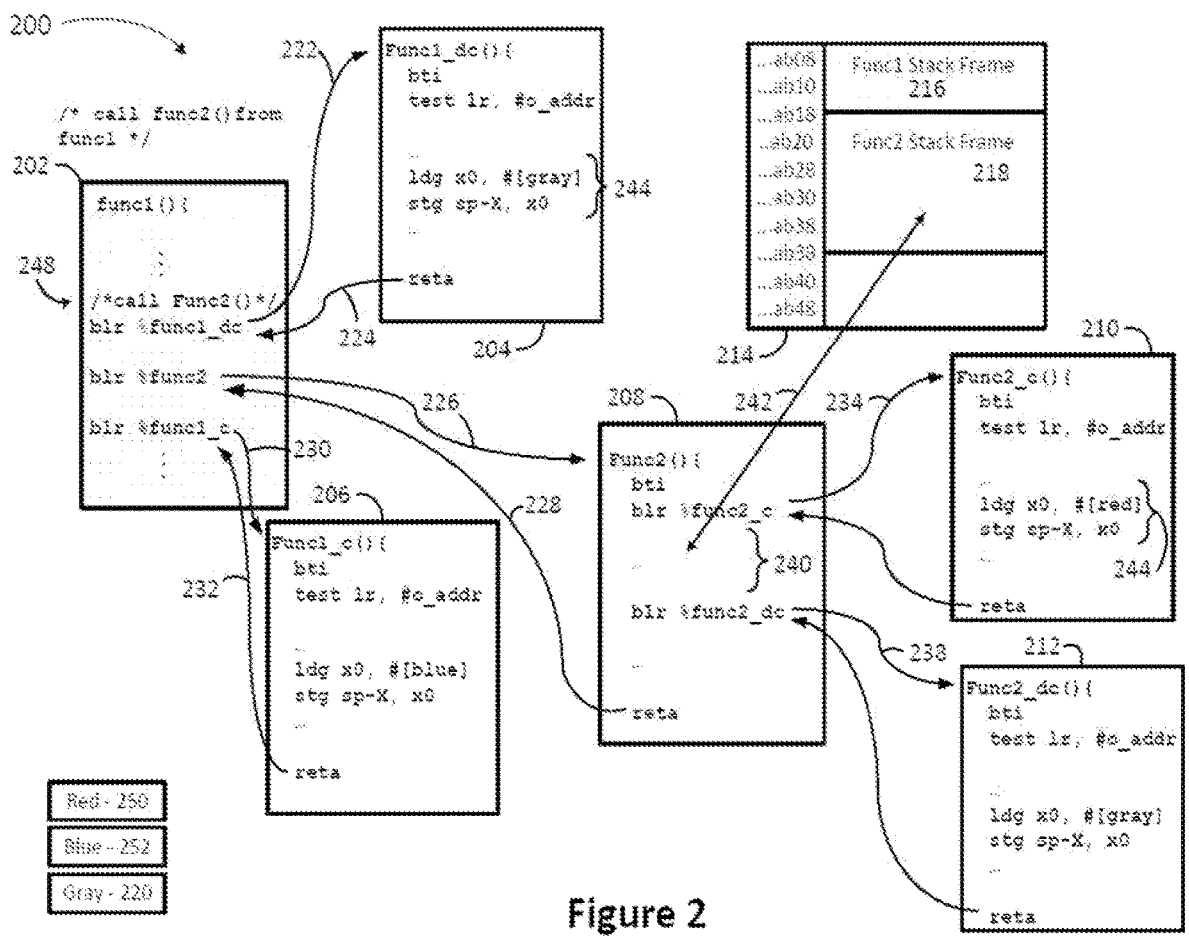
FIG. 2 shows a code overview illustrating a mechanism for providing near full memory safety incorporating aspects of the disclosed embodiments.

Referring to FIGS. 1 and 2, in one embodiment the processor 100 and the memory 152 are configured to provide branch target instruction protection and memory coloring protection. For example, the processor 150 is configured to call 248 a second function 208 from a first function 202 by coloring with an inaccessible color value 220, a first memory area 216 associated with the first function 202, branching 226 to the second function 208, coloring, with a second color value 250, a second memory area 218 associated with the second function 206. Operating (242) on the second memory area 218, coloring, with the inaccessible color value 220, the second memory area 218, returning 228 to the first function 202, and coloring, with a first color value 252, the first memory area 216. The first color value 252, the second color value 250, and the inaccessible color value 220 each comprise different distinct color values.

In one embodiment, the coloring includes branching to a coloring routine 204, 206, 210, 212. The coloring routine comprises a basic block beginning with a single branch target instruction, identifying and authorizing a calling routine, coloring, with a hardcoded color value, a memory area associated with the calling routine, and returning to the calling routine.

As an aid to understanding, certain features of the disclosed embodiments will be described with reference to the ARMv8.5 processor architecture and features. The ARMv8.5 architecture is a reduced instruction set computer (RISC) architecture developed by ARM HOLDINGS plc. References to the ARMv8.5 architecture or other specific processors or architectures are provided herein as an aide to understanding only, and those skilled in the art will readily recognize that the embodiments presented herein may be advantageously employed within other appropriate computing apparatus that may include alternate implementations of the protection features enumerated above, without straying from the spirit and scope of the present disclosure.

The apparatus 100 incorporates a security feature sometimes referred to as write xor execute (W/\X) or data execution prevention. W/\X is a memory protection means where each page in memory can be either writable or executable but not both. Without W/\X protection, a program can exploit software defects, such as buffer overrun defects, to take control of the processor 150. W/\X protection, sometimes referred to as data protection, prevents this type of attack.

In apparatus 100 executable program instructions or executable code are loaded into memory regions that can be executed by the running application but not written or modified. These execute only memory regions are referred to herein as code space. Other memory regions are reserved for data or variables that are expected to be modified or change value during execution of the application. These memory regions may be referred to as data space. W/\X allows instructions stored in code space to be executed but generates a processing exception if an attempt is made to write into code space, i.e. code space is execute only. Similarly, a processing exception is generated if a program attempts to execute an instruction read from data space, i.e. data space can be written but not executed.

The term processing exception as used herein refers to a means of altering program or execution flow such that the exception condition may be appropriately handled by the processor 150. For example a hardware interrupt mechanism may be used to generate processing exceptions if a program attempts to write into code space.

Code generation time or compile time refers to the time at which program code is generated. Program code may be generated for example when a compiler is used to generate program code from a high level language or when a programmer manually hand crafts the program code. The program code so generated is loaded into code space when the application is executed in a computing apparatus. It is often the case that certain data values or constants may be set at code generation time and stored along with executable instructions in the code space. Values that are set at code generation time and stored in code space are referred to herein as hardcoded values or predetermined values. The intent is that predetermined values should never change during execution of an application. By storing these predetermined values in code space, the W/\X protection mechanism implemented in the apparatus 100 will ensure that the predetermined values will remain constant throughout execution of the application.

A memory safety feature referred to as memory coloring, or memory tagging, is supported by the apparatus 100. With memory coloring, blocks of memory are associated or tagged with a certain value known as a color value or tag. Each block of memory, sometimes referred to as a granule, is tagged with a particular value, referred to herein as a color value. The size or number of bytes in each block of memory is referred to as the tagging granularity. When memory is allocated, a memory management unit or other computing apparatus selects a color value and associates this color value with the allocated memory. The selected color value is also associated with a memory pointer returned to the application that requested the memory allocation. Each time memory is accessed, such as with a load or store operation, the color value associated with the memory pointer is compared to the color value associated with the memory being accessed. The processor 150, or other memory management components incorporated within the apparatus 100 are configured to generate a processing exception when there is a mismatch between the pointer color and the memory color.

The number of bits used for each color, referred to as tag size, should be large enough to allow a sufficient number of different color values (for example four bits allows 16 different values) but small enough to be easily handled within the hardware and software. For example the tag size may be configured to fit into the upper unused bits of a pointer which may for example be 8 or 16 bits. Selection of the tag granularity is a tradeoff between the size of the tag, the alignment requirements, and hardware configuration.

Detection of temporal or spatial defects or other memory violations through the use of memory coloring is probabilistic and based on the tag size. For example some calculations predict that with a 4 bit tag size there is a 94% probability of catching a defect.

As an aid to understanding a list of some of the memory coloring or tagging operations provided by the ARMv8.5 architecture are listed in Table 1. As shown in Table 1, the memory coloring or tagging operations include privileged operations and sets of commands to color memory as well as sets of commands to color addresses and pointers, along with commands for performing arithmetic operations on pointers with tags. Features such as managing the tag array, interrupting execution on an improper de-referencing operation, and controlling the coloring mechanism, such as turning coloring on or off, are managed by system registers and microcode.

TABLE 1

| | |
|---|---|
| ST2G | store tag from address for 2 granules in tag array |
| STG | store tag from address for 1 granule in tag array |
| STGP | store tag from address for 1 granule, store data |
| STZ2G | store tag from address for 2 granules, zero granules |
| STZG | store tag from address for 1 granule, zero granule |
| ADDG | offset positively a tagged address |
| GMI | exclude tag from address |
| IRG | insert random tag to address |
| LDG | load tag to address |
| SUBG | offset negatively a tagged |
| SUBP | offset negatively a tagged address and strip tag |
| SUBPS | subtract/compare tagged pointers |
| STGV | (EL1) store vector of tags (to tag array) |
| LDGV | (EL1) load vector of tags (from tag array) |

Coloring instructions are primarily adapted to support the following basic program flow: reserve a granule of memory, obtain a color valued for the memory pointer, and color or tag the reserved memory with the same color value obtained for the memory pointer. This basic flow can be understood with reference to the exemplary embodiment 100 illustrated in FIG. 1 where a program component 126 that is loaded within code space 130 desires access 128 to a memory region 106. The exemplary memory region 106 is illustrated as a frame on a memory stack 154. Alternatively, the memory region 106 may be allocated from heap space or any appropriate type of memory area configured as a data space or read/write memory region. The memory region 106 may be associated with a color value 138 through a tag array 156. Each entry in the tag array, such as entry 120, associates a color value 138 with a memory region 106 through a memory pointer 118. The tag array 156 may include multiple entries 122, 120, each having its own color value 138, 124 and pointer 114, 118. When memory pointers used by the code module 126 include the same color value 138 as the memory region 106 being accessed 128 the memory access succeeds. Improper de-referencing, which means accessing memory with a pointer that has a different color value than the memory being accessed, is caught at run time and results in a processing exception.

Call flow integrity within the apparatus 100 is enhanced by a feature referred to herein as a branch target instruction protection. In an apparatus (100) that provides branch target instruction (BTI) protection, certain instructions are marked as being branch targets. Whenever a programmatic branch or jump operation passes execution control to an instruction that is marked as a branch target, program execution continues normally, and when a programmatic branch or jump operation passes execution control to an instruction that is not appropriately marked as a branch target, a processing exception is thrown. As used herein the term branch target instruction refers to an instruction that has been marked as a branch target.

Branch target instruction protection may be implemented in a variety of ways. For example the ARMv8. architecture manages special guarded memory regions 134 and provides a BTI virtual assembler instruction. Within the guarded memory region 134, a branch or jump to most instructions will generate a processing exception. Jumping or branching 132 to a BTI instruction within the guarded memory region however, will not under certain conditions, generate a branch target exception and will allow execution to proceed to subsequent instructions within the memory region 134.

The apparatus 100 includes a protected or guarded memory region 134 where a BTI mechanism is active such that only BTI instructions may be the target of a programmatic branch or jump. After branching 132 to a BTI instruction, subsequent instructions following the BTI instruction will be executed sequentially.

Alternatively the BTI mechanism may be implemented through any desired means, such as by placing markers or special instructions within the code or by maintaining a table of allowed branch targets or entry points, or other appropriate means of enforcing only certain instruction as being allowed branch targets. A person of ordinary skill in the art will readily recognize that any branch target protection mechanism that ensures programmatic jump or branch operations can only be performed to certain welldefined instructions may be advantageously employed without straying from the spirit and scope of the present disclosure.

Execution flow may be enforced by placing a branch target instruction at the beginning of a routine or function and not marking any of the remaining instructions within the routine or function as BTI. This guarantees that the routine or function must always be entered at the desired entry point or beginning instruction and any attempt to enter the routine elsewhere within the body of the function will generate a processing exception. Thus BTI protection prevents a malicious application from using or accessing a portion or sequence of instructions within the routine or function for its own purpose.

FIG. 2 shows a code overview 200 illustrating a mechanism for providing near full memory safety incorporating aspects of the disclosed embodiments. The features illustrated in FIG. 2 are appropriate for providing memory safety and call flow integrity within a computing apparatus such as the apparatus 100 illustrated in FIG. 1 and described above.

For illustrative purposes, regions of memory and executable code having a same color value are represented using shading patterns where regions shaded with the same pattern have like color values. A first pattern 250 will represent a first color value such as red, a second pattern 252 represents a different color value such as blue, and a third pattern 220 represents a third different color value such as grey.

Color values used in the functions 202, 208 and the coloring routines 204, 206, 210, 212, are pre-determined and set at code generation time. This allows the color values to be hardcoded, i.e. loaded into a code segment at run time, to protect them from tampering during program execution.

The overview 200 depicts a software call flow scenario where a first function 202, func1( ), makes a programmatic call or branch to a second function 208, func2( ). Also illustrated is a portion of a memory stack 214 where portions of memory, sometimes referred to as stack frames, 216, 218 are allocated for use by the first function 202 and the second function 208 respectively. The overview 200 illustrates the state of memory coloring, i.e. the assignment of color values, at a point in time where program execution is within the body portion 246 of the second function 208.

In the illustrated embodiment 200, when the first function 202 reaches a point 248 where it needs to call or branch 226 to the second function 208, the first function 202 passes control 222 or execution flow to a coloring routine 204. The arrows in FIG. 2, such as arrows 222 and 224 depict passing program execution flow between different software routines or functions. A routine such as the first function 202 passes execution flow 222 to a coloring routine 204 by making a programmatic call to that coloring routine 204. When the coloring routine 204 has completed its processing, execution flow is returned 224 to the calling routine or function as indicated by the arrow 224.

As will be discussed further below, memory coloring is modified during program execution by coloring routines that are configured to protect the coloring operations from tampering or misuse. All four coloring routines 204, 206, 210, 212, are similar with differences in the color value they apply and the memory regions they operate on. The four coloring routines 204, 206, 210, 212, are configured to perform the following steps in the following order: identify the calling routine, verify the calling routine is authorized to use this coloring routine, apply a pre-determined color to a desired memory region, and return to the calling function or routine.

The color values applied by the coloring routines 204, 206, 210, 212, are predetermined and protected from modification by hard coding them within the code space. However, an attacker could still take control of the coloring by modifying program flow such that the coloring instructions were executed without first executing the identification and authorization checks. To prevent misuse of the coloring instructions each coloring routine 204, 206, 210, 212, is protected using branch target instruction protection as described above.

Each coloring routine 204, 206, 210, 212, includes a basic block beginning with a single branch target instruction, which means that branch target instruction protection is used to ensure the coloring routine 204, 206, 210, 212, may only be entered at its beginning or predefined entry point, and must perform all the processing steps included in the coloring routine 204, 206, 210, 212, in order, thereby preventing an unauthorized malicious application from skipping the identification and authorization steps and executing the coloring instructions without authorization.

The term de-coloring refers to associating a reserved or inaccessible color value 220 with a memory region where the reserved color value 220 is not used for accessing any memory region and when the inaccessible color value is associated with a memory region, the de-colored memory region may not be accessed by any program code. As used herein the term inaccessible color value 220 is used to refer to a color value 220 that renders a memory region inaccessible to any program code, such as the reserved or inaccessible color value 220 illustrated in the overview 200. A coloring routine 204, 212, that is configured to color memory with the inaccessible color 220 may be referred to herein as a de-coloring routine.

When implemented in an ARMv8.5 type processor, branch target instruction protection is achieved by loading the coloring routine 204, 206, 210, 212, into a guarded memory region and placing a BTI virtual assemble instruction at the beginning of the routine. There is only a single BTI instruction in each coloring routine 204, 206, 210, 212, located at the beginning of the routine, thereby preventing entry into the coloring routine except via the BTI instruction at the beginning of the routine.

The above described coloring routines 204, 206, 210, 212, can be employed to provide near full memory safety and reduce the risk of ROP attacks when a first function 202 calls a second function 208. Prior to branching 226 to the second function 208, the first function 202 calls a coloring routine 204 to de-color the memory region 216 associated with the first function 202. The de-coloring routine 204 is hardcoded with a predefined inaccessible color value 220 and configured to associate the memory area 216 with the inaccessible color value 220. Coloring the memory area 216 with the inaccessible color prevents any access or modification to the memory region 216 that was used by the first function 202 while control is passed to the second function 208.

Upon receiving control 226, the second function begins by calling 234 a coloring routine 210 configured to color memory with a color value 250 that renders the memory region 218 used by the second function 208 accessible to the second function 208. After completion, the coloring routine 210 returns to the second function 208 where the second function may proceed with its desired processing 240 while interacting with the colored memory region 218. Once the second function 208 completes its processing 240, and before returning to the first function 202, the second function 208 calls 238 a de-coloring routine 212 that is hardcoded to associate the inaccessible color value 220 with the memory region 218, thereby rendering the memory region 218 inaccessible to any code module.

In certain embodiments, such as when the memory region 218 has been populated with highly sensitive data, additional security may be provided by resetting the memory values stored in the memory region 218 to all zero values. This step completely erases the data making it unrecoverable even to a program that does manage to bypass the memory coloring protections.

Upon return from the second function 208, the first function 202 prepares to resume execution by calling 230 a coloring routine 206 configured to re-color the memory region 216 with a pre-determined first color value 252. The first function 202 can then resume its processing while accessing its allocated memory region 216.

Advantageously the color values used, for example red 250, blue 252, and gray 220 which represents the inaccessible color value, are all distinct and different from each other. Use of different color values for each memory color prevents the first function 202 from accessing memory 218 belonging to the second function 208, and prevents the second function 208 from accessing memory 216 belonging to the first function 202. Having the inaccessible color value 220 different than either the first color value 250 or the second color value 252 prevents either the first function 202 or the second function 208 from accessing de-colored memory during periods where the memory is protected, i.e. the memory is de-colored or assigned an inaccessible color value 220.

Advantages of the above described embodiments may be appreciated by considering a threat model were an attacker gains control of the coloring and thereby gains access to memory regions containing sensitive data. Because of the W/\X protections built into the apparatus 100, hardcoding the color values and incorporating the color values in code space prevents an attacker from modifying the color values which are hardcoded within each coloring routine. Protecting the coloring routines 204, 206, 210, 212, with branch target instruction protection and marking the entry point or beginning instruction of each coloring routine 204, 206, 210, 212, with BTI prevents and attacker from bypassing the identification and authorization steps included in each coloring routine 204, 206, 210, 212 and employing the coloring operations as a gadget for malicious purposes. Thus combining two hardware primitives, memory coloring and branch target instruction protection, in the disclosed fashion provides a simple and efficient approach to enforcing memory security and call flow integrity.

Because both these primitives, memory coloring and branch target instruction protection, are very lightweight, the only systematic computational overhead to be expected with the disclosed embodiments results from the extra code instructions needed to manipulate the color values and protect the coloring routines. The computational and memory usage overhead can therefore be estimated to be about one to three percent (1%-3%). In contrast conventional solutions for providing memory safety and call flow integrity experience computational and memory usage overhead of about four hundred percent (400%).

The attack surface or risk associated with a particular embodiment is inversely related to the granularity or size of each memory region being colored. Compromising a larger memory region gives an attacker access to a larger amount of data. Having a higher number of small memory regions introduces increased complexity and overhead associated with applying different color values to many small memory regions. Thus a tradeoff exists between risk and cost.

A low risk embodiment may use a finer grained approach to apply different color values upon entering and exiting each basic block in the code. Rather than using the same memory color for an entire function, each basic block within a function employs a different memory color value. The term basic block as used here refers to a straight-line code sequence, or sequence of software instructions, with no branches in except to the entry and no branches out except at the exit. Use of a distinct color value for each basic block prevents an attacker that compromised one basic block or color value from gaining access to data associated with other basic blocks in the same function.

In embodiments where objects are larger in size, it may be advantageous to use different color values for the memory area used to store each memory object, i.e. each memory object is associated with its own color value. As used herein the term memory object refers to a data structure or an instance of a class as it is stored in computer memory.

In certain embodiments parameters or values being passed from a calling function to a called function may be placed on the stack by the calling function where they can be accessed by the called function. As used herein the term stack parameter refers to a parameter or memory object that is placed on the stack when begin passed between a calling function and a called function. It may be advantageous to apply a color value to these stack parameters that is different than the color value used by either the calling or called functions. Use of a different color value for the stack parameters allows access to the stack parameters to be managed independently from other memory regions used by either the calling or the called function.

A more course grained approach to coloring is similar to the embodiment illustrated in FIG. 2 and described above where coloring is performed by function. For example a first color value, such as blue 252, is used during execution of the first function 202 and a second color value, such as red 250, is used during execution of the second function 208. With the embodiment 200 the entire stack frame 218 associated with the second function, as well as any other memory regions allocated by the second function receive the same color value 250.

It is common software development for applications developed by one company to make use of libraries sourced from a different company. The application developers will typically have a lower degree of knowledge and trust for the third party library than they have in their own application code. Source code for the library may not be available or the cost of modifying and validating the library may be prohibitive so modifying the library to use a function by function approach to memory coloring as described above may not be desirable. However, the above escribed methods of using memory coloring and branch target instruction protection may still be applied to improve the overall system security without modifying the library itself. By employing a first color value for code in the application and a second color value for all functions and routines in the library, memory safety and call flow integrity can be improved. While this approach is courser or less granular than other approaches described herein it still provides significant advantages while keeping development and implementation costs low.

Figure 3:
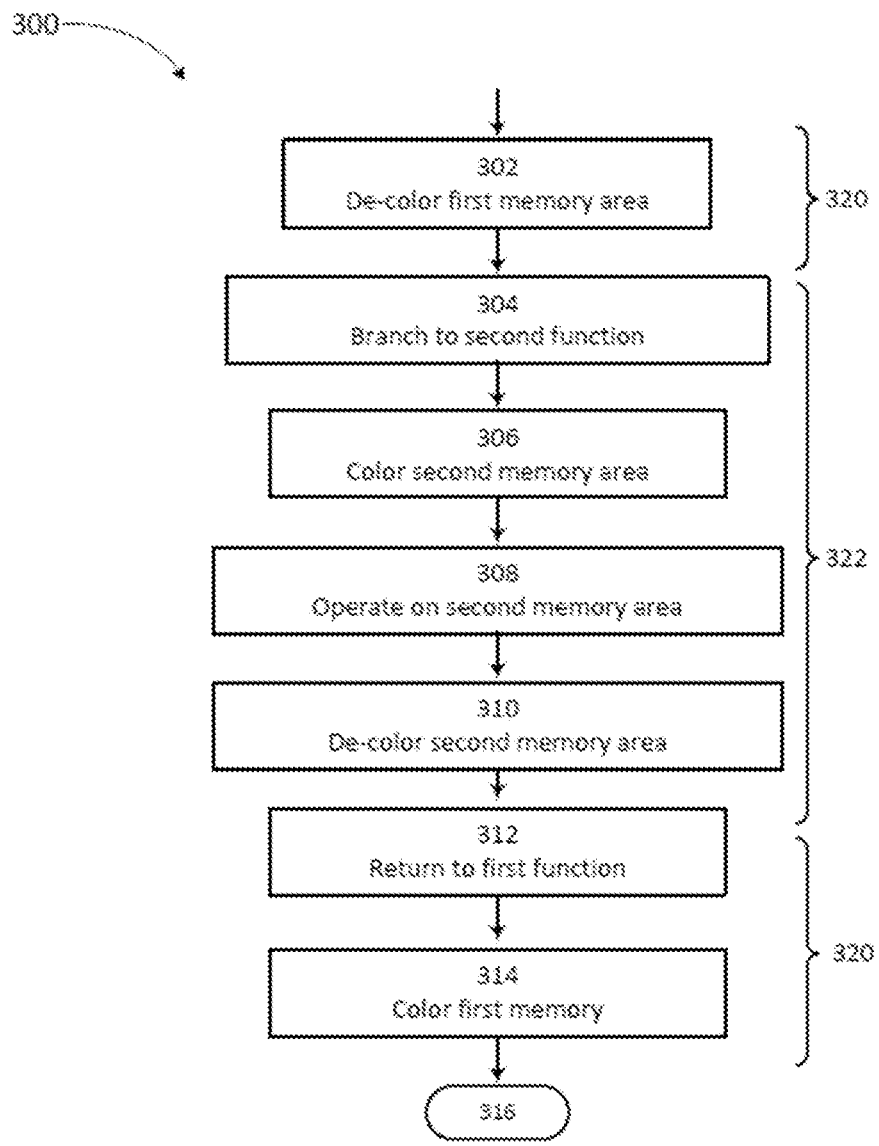
FIG. 3 illustrates a flow chart of an exemplary method for providing memory protection and call flow integrity in a computing apparatus incorporating aspects of the present disclosure.

FIG. 3 illustrates a flow chart of an exemplary method 300 for providing memory protection and call flow integrity in a computing apparatus incorporating aspects of the present disclosure. The method 300 is appropriate for use in a wide range of modern computing apparatus such as the computing apparatus 100 described above and with reference to FIG. 1. The method 300 takes advantage of computing apparatus that provide two hardware primitives, memory coloring and branch target instruction protection, as is common in many modern mobile communications apparatus such as cell phones, mobile phones, phablet computes, and many wirelessly networked computing apparatus.

The method 300 begins when a first function 320 prepares to branch to a second function 322. Prior to branching to the second function 322, memory used by the first function 320 and memory pointers embedded within code of the first function 320 are colored with a first color value, thereby allowing the first function 320 to complete its desired processing. When preparing to branch, memory associated with the first function 320 is de-colored 302 by associating the memory region with an inaccessible color value such that the memory is no longer accessible form any segment of code. As will be discussed further below, the coloring and de-coloring is accomplished by branching to specially configured coloring routines.

The first function 320 then branches 304 to a second function 322. Before initiating processing within the second function 322, memory regions and associated memory pointers are colored with a second color value 306. The memory regions may be any desired type of computer accessible memory such as a stack frame, heap space, or other desired memory region. Once coloring with the second color is complete, the second function 322 may access the associated memory regions to complete any desired processing and software operations 308.

Before returning to the first function 320, the second function 322 de-colors 310 its associated memory regions by tagging or associating them with an inaccessible color value to protect them from unauthorized access. Control is returned to the first function 320 where, before continuing with any processing, memory associated with the first function is colored with the first color value 314 thereby giving the first function 320 access to the associated memory regions. The first function 320 may then continue on with its processing 316.

Figure 4:
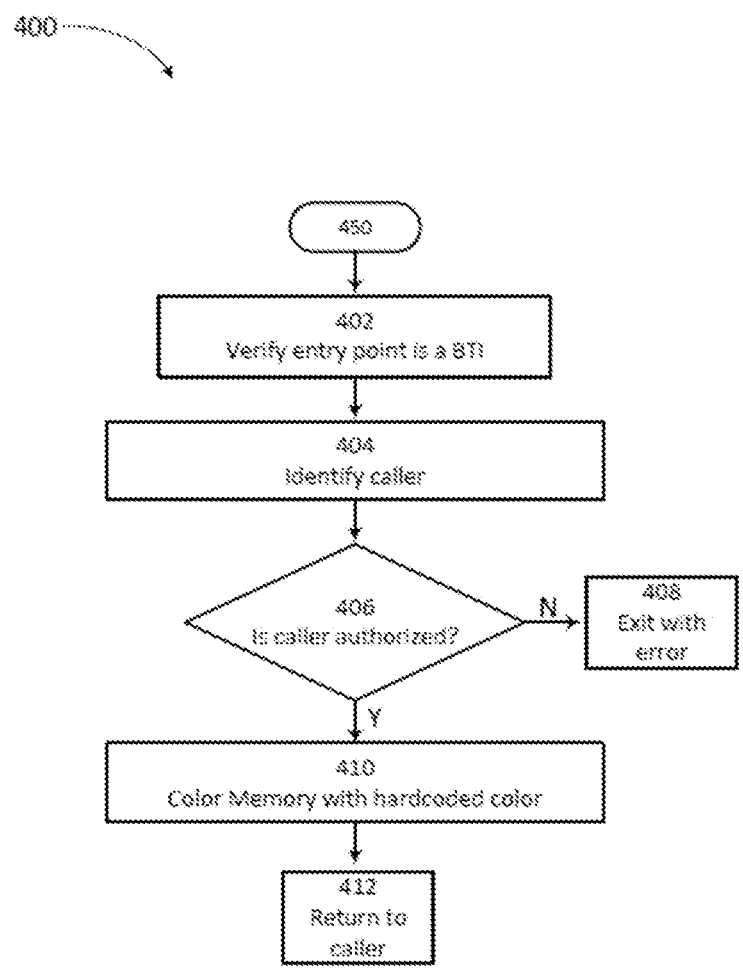
FIG. 4 illustrates a flow chart of an exemplary coloring routine configured to safely color a memory region incorporating aspects of the disclosed embodiments.

FIG. 4 illustrates a flow chart of an exemplary coloring routine 400 incorporating aspects of the disclosed embodiments. The coloring routine 400 is appropriate for preforming the coloring or de-coloring steps included in the exemplary method 300 described above and with reference to FIG. 3.

The coloring routine 400 is beneficially protected by branch target instruction protection and W/\X or data execution prevention mechanisms. The entry point or beginning instruction 450 of the coloring routine 400 is marked as a branch target through any appropriate BTI means as described above. On entry, the processor or other BTI mechanism verifies 402 that the instruction being branched to is a valid branch target. If a branch is attempted to any instructions within the coloring routine 400 other than the pre-defined and appropriately marked entry point 450, a processing exception is generated and suitable exception processing may be initiated.

Next the coloring routine identifies 404 the calling routine. Identification may be accomplished in any desired fashion, such as inspection of the return address or other means. A check 406 is then made to ensure the calling routine or function is authorized to use this coloring routine 400. When the calling routine or function is not authorized (406-N) the coloring routine exits 408 and no coloring operations are performed. Before returning to the calling function it may be desirable in certain embodiments to perform error processing, or return an error code or otherwise indicate an exception occurred so appropriate action may be taken.

When the calling routine is determined to be authorized (406-Y), the memory region is colored 410 with the hardcoded memory color. Use of a hardcoded color value improves security by preventing an attacker from exploiting the coloring instructions during an attack. Coloring the memory allows the calling routine to access the memory while completing its desired processing. Control is then returned 412 to the calling routine.

Protecting the hardcoded color value from modification is important for security reasons. As described above, the hardcoded color value is set at code generation time and stored in the code space along with the program instructions. At run time, the coloring routine 400 is loaded into an execute only code region where it can be protected through the use of a data execution protection mechanism.

Thus, while there have been shown, described and pointed out, fundamental novel features of the invention as applied to the exemplary embodiments thereof, it will be understood that various omissions, substitutions and changes in the form and details of apparatus and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus comprising:
    a memory configured to store program instructions; and
    a processor coupled to the memory, wherein the program instructions cause the processor to be configured to call a second function from a first function by:
        coloring with an inaccessible color value, a first memory area associated with the first function;
        branching to the second function;
        coloring with a second color value a second memory area associated with the second function;
        operating on the second memory area;
        coloring with the inaccessible color value, the second memory area;
        returning to the first function; and
        coloring with a first color value, the first memory area,
    wherein each of the first color value, the second color value, and the inaccessible color value comprises distinct color values, and
    wherein coloring a memory area comprises:
        branching to a coloring routine, wherein the coloring routine comprises a basic block that comprises and begins with a single branch target instruction and does not comprise another branch instruction;
        identifying and authorizing a calling routine;
        coloring with a hardcoded color value the memory area associated with the calling routine, wherein the calling routine comprises code including the hardcoded color value that is preset at code generation time and that is applied by the coloring routine to the associated memory area; and
        returning to the calling routine.

2. The apparatus according to claim 1, wherein the coloring routine is located in an execute-only memory area of the memory, and wherein the program instructions further cause the processor to be configured to prevent writing to the execute-only memory area.

3. The apparatus according to claims 1, wherein the first memory area and the second memory area are allocated in a read or write portion of the memory and comprise at least one of a stack frame and a heap area, and wherein the program instructions further cause the processor to be configured to prevent execution of data in the first memory area or the second memory area.

4. The apparatus according to claims 1, wherein the program instructions further cause the processor to be configured to pass one or more stack parameters from the first function to the second function, wherein the one or more stack parameters are colored with a third color value, wherein the third color value is different than the inaccessible color value or the first color value, and wherein the program instructions further cause the processor to be configured to read or write the one or more stack parameters.

5. The apparatus according to claims 1, wherein one or more memory objects are stored in a stack frame of the memory, wherein each of the one or more memory objects is colored with a distinct color value, and wherein the program instructions further cause the processor to be configured to read or write the one or more memory objects.

6. The apparatus according to claims 1, wherein the second function comprises a plurality of basic blocks, and wherein one or more memory objects associated with each basic block are colored with a distinct color value.

7. The apparatus according to claims 1, wherein one or more second program instructions associated with an application are colored with a fourth color value, wherein a plurality of routines associated with a software library that is accessed by the application are colored with a fifth color value, wherein the fourth color value is different than the fifth color value, and wherein the program instructions further cause the processor to be configured to execute the application.

8. The apparatus according to claims 1, wherein the second memory area comprises a stack frame, wherein coloring the second memory area with the inaccessible color value comprises resetting the second memory area to zero values.

9. The apparatus according to claim 1, wherein the apparatus is a mobile communications device.

10. A method for branch target instruction and memory coloring, the method comprising:

coloring with an inaccessible color value, a first memory area of a memory, wherein the first memory area is associated with a first function;

branching to a second function;

coloring with a second color value, a second memory area of the memory, wherein the second memory area is associated with the second function;

operating on the second memory area upon branching to the second function;

coloring with the inaccessible color value, the second memory area;

returning to the first function; and coloring with a first color value, the first memory area, wherein each of the first color value, the second color value, and the inaccessible color value comprises distinct color values, and wherein coloring a memory area comprises:

branching to a coloring routine, wherein the coloring routine comprises a single basic block that comprises and begins with a branch target instruction and does not comprise another branch instruction;

identifying and authorizing a calling routine;

coloring with a hardcoded color value, the memory area associated with the calling routine, wherein the calling routine comprises code including the hardcoded color value that is preset at code generation time and that is applied by the coloring routine to the associated memory area; and returning to the calling routine.

11. The method according to claim 10, further comprising passing one or more stack parameters from the first function to the second function, wherein the one or more stack parameters are colored with a forth color value, wherein the fourth color value is different than any one of the inaccessible color value, the first color value, and the second color value.

12. The method according to claim 10, wherein one or more memory objects are stored in a stack frame of the memory, and wherein each of the one or more memory objects is colored with a distinct color value.

13. The method according to claims 10, wherein the second function comprises a plurality of basic blocks, and wherein one or more memory objects associated with each basic block are colored with a distinct color value.

14. A computer program product comprising computer-executable instructions stored on a non-transitory computer-readable medium that, when executed by a processor, cause the processor to:

color with an inaccessible color value a first memory area associated with a first function;

branch to a second function;

color with a second color value a second memory area associated with the second function;

operate on the second memory area upon branching to the second function;

color with the inaccessible color value the second memory area;

return to the first function; and color with a first color value the first memory area, wherein each of the first color value, the second color value, and the inaccessible color value comprises distinct color values, and wherein coloring a memory area comprises:

branching to a coloring routine, wherein the coloring routine comprises a single basic block that comprises and begins with a branch target instruction and does not comprise another branch instruction;

identifying and authorizing a calling routine;

coloring with a hardcoded color value the memory area associated with the calling routine, wherein the calling routine comprises code including the hardcoded color value that is preset at code generation time and that is applied by the coloring routine to the associated memory area; and returning to the calling routine.

15. The computer program product according to claim 14, wherein the coloring routine is located in an execute-only memory area of the non-transitory computer-readable medium.

16. The computer program product according to claim 14, wherein the computer-executable instructions further cause the processor to pass one or more stack parameters from the first function to the second function, wherein the one or more stack parameters are colored with a third color value, wherein the third color value is different than the inaccessible color value or the first color value, and wherein the computer-executable instructions further cause the processor to read or write the one or more stack parameters.

17. The computer program product according to claim 14, wherein one or more memory objects are stored in a stack frame of the non-transitory computer-readable medium, wherein each of the one or more memory objects is colored with a distinct color value, and wherein the computer-executable instructions further cause the processor to read or write the one or more memory objects.

18. The computer program product according to claim 14, wherein the second function comprises a plurality of basic blocks, and wherein one or more memory objects associated with each basic block are colored with a distinct color value.

19. The computer program product according to claim 14, wherein one or more second program instructions associated with an application are colored with a fourth color value and a plurality of routines associated with a software library that is accessed by the application are colored with a fifth color value, wherein the fourth color value is different than the fifth color value, and wherein the program instructions further cause the processor to be configured to execute the application.

20. The computer program product according to claim 14, wherein the second memory area comprises a stack frame, wherein coloring the second memory area with the inaccessible color value comprises resetting the second memory area to zero values.

* * * * *

UNITED STATES PATENT AND TRADEMARK OFFICE
CERTIFICATE OF CORRECTION

PATENT NO. : 11,868,466 B2
APPLICATION NO. : 17/434643
DATED : January 9, 2024
INVENTOR(S) : Jan-Erik Ekberg It is certified that error appears in the above-identified patent and that said Letters Patent is hereby corrected as shown below:

On the Title Page

Item (71) Applicants: "Huawei Technologies Co., Ltd., Shenzhen (CN); Jan-Erik Ekberg, Helsinki (FI)" should read "Huawei Technologies Co., Ltd., Shenzhen (CN)"

In the Claims

Claim 1, Column 13, Line 61: "coloring with a second color value a second memory" should read "coloring with a second color value, a second memory"

Claim 1, Column 14, Line 10: "coloring with a hardcoded color value the memory area" should read "coloring with a hardcoded color value, the memory area"

Claim 3, Column 14, Line 23: "The apparatus according to claims 1, wherein the first" should read "The apparatus according to claim 1, wherein the first"

Claim 4, Column 14, Line 30: "The apparatus according to claims 1, wherein the" should read "The apparatus according to claim 1, wherein the"

Claim 5, Column 14, Line 40: "The apparatus according to claims 1, wherein one or" should read "The apparatus according to claim 1, wherein one or"

Claim 6, Column 14, Line 46: "The apparatus according to claims 1, wherein the" should read "The apparatus according to claim 1, wherein the"

Claim 7, Column 14, Line 50: "The apparatus according to claims 1, wherein one or" should read "The apparatus according to claim 1, wherein one or"

Claim 8, Column 14, Line 59: "The apparatus according to claims 1, wherein the" should read "The apparatus according to claim 1, wherein the"

Signed and Sealed this
Twelfth Day of March, 2024

Katherine Kelly Vidal
*Director of the United States Patent and Trademark Office*

CERTIFICATE OF CORRECTION (continued)
U.S. Pat. No. 11,868,466 B2

Claim 13, Column 15, Line 41: "The method according to claims 10, wherein the" should read "The method according to claim 10, wherein the"

Claim 14, Column 15, Line 49: "color with an inaccessible color value a first memory area" should read "color with an inaccessible color value, a first memory area"

Claim 14, Column 15, Line 52: "color with a second color value a second memory area" should read "color with a second color value, a second memory area"

Claim 14, Column 15, Line 56: "color with the inaccessible color value the second" should read "color with the inaccessible color value, the second"

Claim 14, Column 16, Line 2: "color with a first color value the first memory area," should read "color with a first color value, the first memory area,"

Claim 14, Column 16, Line 12: "coloring with a hardcoded color value the memory area" should read "coloring with a hardcoded color value, the memory area"